(12) United States Patent
Kuhnigk

(10) Patent No.: US 7,315,639 B2
(45) Date of Patent: Jan. 1, 2008

(54) METHOD OF LUNG LOBE SEGMENTATION AND COMPUTER SYSTEM

(75) Inventor: Jan-Martin Kuhnigk, Bremen (DE)

(73) Assignee: Mevis GmbH, Bremen (DE)

( * ) Notice: Subject to any disclaimer, the term of this patent is extended or adjusted under 35 U.S.C. 154(b) by 648 days.

(21) Appl. No.: 10/793,669

(22) Filed: Mar. 3, 2004

(65) Prior Publication Data

US 2005/0196024 A1    Sep. 8, 2005

(51) Int. Cl.
*G06T 17/40* (2006.01)
(52) U.S. Cl. .................. 382/131; 382/154; 382/173
(58) Field of Classification Search ............... None
See application file for complete search history.

(56) References Cited

U.S. PATENT DOCUMENTS

| | | | | |
|---|---|---|---|---|
| 4,913,157 | A * | 4/1990 | Pratt et al. | 600/449 |
| 5,384,861 | A * | 1/1995 | Mattson et al. | 382/131 |
| 6,453,064 | B1 * | 9/2002 | Aikawa et al. | 382/154 |
| 6,690,816 | B2 * | 2/2004 | Aylward et al. | 382/128 |
| 7,027,630 | B2 * | 4/2006 | Bruijns | 382/131 |
| 2003/0068074 | A1 * | 4/2003 | Hahn | 382/128 |
| 2003/0099390 | A1 * | 5/2003 | Zeng et al. | 382/131 |
| 2003/0179249 | A1 * | 9/2003 | Sauer et al. | 345/848 |
| 2004/0017935 | A1 * | 1/2004 | Avinash et al. | 382/131 |
| 2005/0152588 | A1 * | 7/2005 | Yoshida et al. | 382/128 |
| 2006/0239522 | A1 * | 10/2006 | Ferrant et al. | 382/128 |
| 2006/0257053 | A1 * | 11/2006 | Boudreau et al. | 382/305 |
| 2007/0127802 | A1 * | 6/2007 | Odry et al. | 382/131 |
| 2007/0133894 | A1 * | 6/2007 | Kiraly et al. | 382/260 |

OTHER PUBLICATIONS

Hu, S. et al. "Automatic Lung Segmentation for Accurate Quantization of Volumetric X-Ray CT Images", IEEE Transactions on Medical Imaging, 2001, 20(6): 490-498.*
Kiraly, A.P. et al. "Three Dimensional Human Airway Sementation Methods for Clinical Virtual Bronchoscopy", Academic Radiology, 2002, 9(10): 1153-1168.*
S. Krass et al, A Method for the Determination of Bronchopulmonary Segments Based on HRCT Data, CARS 2000, pp. 584-589, XP008019539.
Dirk Selle et al, Analysis of Vasculature for Liver Surgical Planning, IEEE Transactions on Medical Imaging, vol. 21, No. 11, Nov. 2002, pp. 1344-1357,XP-002250046.
Horst K. Hahn et al, The Skull Stripping Problem in MRI Solved by a Single 3D Watershed Transform, Proc. MICCAI, LNCS 1935, 134-143, pp. 1-10,Springer, Berlin, 2000.

(Continued)

*Primary Examiner*—Brian P. Werner
*Assistant Examiner*—Jared W Radkiewicz
(74) *Attorney, Agent, or Firm*—Martin Fleit; Paul D. Bianco; Fleit Kain Gibbons Gutman Bongini & Bianco P.L.

(57) ABSTRACT

A method of lung lobe segmentation having the steps of: providing of three dimensional first image data of a lung; segmentation of a tubular structure to identify first voxels of the first image data belonging to the tubular structure and to identify second voxels of the first image data which do not belong to the tubular structure; determining a distance measure for each one of the second voxels, by determining a minimum distance between each one of the second voxels to one of the first voxels to provide second image data; and performing a lobe segmentation based on the second image data.

20 Claims, 4 Drawing Sheets

OTHER PUBLICATIONS

Shiying Hu et al, Automatic Lung Segmentation for Accurate Quantitation of Volumetric X-Ray CT Images, IEEE Transactions on Medical Imaging, vol. 20. No. 6, Jun. 2001, pp. 490-498, XP-001096747.

I.E. Pratikakis et al, Low Level Image Partitioning Guided by the Gradient Watershed Hierarchy, signal processing 75 (1999), pp. 173-195.

* cited by examiner

METHOD OF LUNG LOBE SEGMENTATION AND COMPUTER SYSTEM

BACKGROUND OF THE INVENTION

1. Field of the Invention

The present invention relates to the field of segmentation of medical digital images, and more particularly to lung lobe segmentation.

2. Prior Art

The human lungs are composed of distinct anatomic compartments called lobes. Since they represent functional units, the lobes have their own bronchial and vascular systems. These systems are solely connected close to the hilus, which is defined as the area where bronchi as well as the pulmonary arteries and veins enter the lungs. The lobes in each lung are separated by thin tissue, the so-called lobar fissures. An oblique fissure and a horizontal fissure divide the right lung into upper, lower, and middle lobe. In the left hand lung there is only an oblique fissure separating lower and upper lobe.

High-resolution X-ray computer tomography (CT) is the standard for pulmonary imaging. Depending on the scanner hardware, CT can provide high spatial and high temporal resolution, excellent contrast resolution for the pulmonary structures and surrounding anatomy, and the ability to gather a complete three-dimensional (3-D) volume of the human thorax in a single breath hold (E A Hoffman and G McLennan, "Assessment of the pulmonary structure-function relationship and clinical outcomes measures: Quantitative volumetric CT of the lung," *Academic Radiol.*, vol. 4, no. 11, pp. 758-776, 1977).

Pulmonary CT images have been used for applications such as lung parenchyma density analysis (L W Hedlund, R F Anderson, P L Goulding, J W Beck, E L Eff-mann, and C E Putman, "Two methods for isolating the lung area of a CT scan for density information," *Radiology*, vol. 144, pp. 353-357, 1982, R Uppaluri, T Mitsa, M Sonka, E A Hoffman, and G McLennan, "Quantification of pulmonary emphysema from lung CT images using texture analysis," *Amer J Resp Crit Care Med.*, vol. 156, no. 1, pp. 248-254, 1997), airway analysis (I Amirav, S. S. Kramer, M. M. Grunstein, and E. A. Hoffman, "Assessment of methacholine-induced airway constriction by ultrafast high-resolution computer tomography," *J Appl. Physiol.*, vol. 144, no. 1, pp. 208-212, 1991; R H Brown, C J Herold, C A Hirshman, E A Zerhouni, and W Mitzner, "In vivo measurment of airway reactivity using high resolution computed tomography," *Amer. Rev. Resp. Dis.*, vol. 144, no. 1, pp. 208-212, 1991), and lung and diaphragm mechanics analysis (E A Hoffman, T Behrenbeck, P A Chevalier, and E H Wood, "Estimation of regional pleural surface expansile forces in intact dogs," *J. Appl. Phsyiol.*, vol. 55, no. 3, pp. 935-948, 1983; A M Boriek, S Liu, and J R Rodarte, "Costal diaphragm curvature in the dog," *J. Appl. Physiol.*, vol. 75, no. 2, pp. 527-533, 1993). A precursor to all of these quantitative analysis applications is lung segmentation.

A number of techniques for computer-assisted segmentation of pulmonary CT images has been developed in the past. A fully automatic method for identifying the lungs in CT images is known from "Automatic lung segmentation for accurate quantitation of volumetric X-ray CT images", By, Hu, S., Hoffman, E. A., Reinhardt, J. M., Medical Imaging, IEEE Transactions, Pages 490 to 498, June 2001 Volume:20 Issue:6.

This method has three main steps:

First, the lung region is extracted from the CT images by grey-level thresholding. The left and right lungs are then separated by detecting the anterior and posterior junctions. Finally, the lung boundary is smoothed along the mediastinum.

Such prior art lung segmentation techniques do not take the the lung lobes into account and thus do not provide lobar quantitation support.

Further, the extraction of lobar fissures using morphological knowledge is as such known from L Zhang and J M Reinhardt, "Detection of lung lobar fissures using fuzzy logic," in physiology and Function from Multidemensional Images, L. Zhang, E. A. Hoffman, and J. M. Reinhardt, "Lung lobe segmentation by graph search with 3D shape constraints," in Physiology and Function from Multidimensional Images, C.-T. Chen and A. V. Clough, eds., *Proc. SPIE* 4321, pp. 204-215, 2001, C.-T Chen and A V Clough, eds., Proc SPIE 3660, pp. 188-199, 1999; "Extraction of pulmonary fissures from thin-section CT images using calculation of surface-curvatures and morphology filters", By, Kubo, M., Niki, N., Eguchi, K., Kaneko, M., Kusumoto, M., Moriyama, N., Omatsu, H., Kakinuma, R., Nishiyama, H., Mori, K., Yamaguchi, N. Image Processing, 2000. Proceedings. 2000 International Conference on Page(s): 637-640 vol. 2 2000 Volume:2. Here, the fissures are used for the diagnosis of lung cancer and the analysis of pulmonary conformation. Again only morphological knowledge is used.

From Krass et al: "A method for the determination of bronchopulmonary segments based on HRCT data", International Congress Series, Excerpta Medica, Amsterdam, N L, vol. 1214, 28 Jun. 2000 (2000-06-28) pages 584-589, XP008019539 ISSN: 0531-5131 it is known to segment the lung parenchyma using a region growing algorithm. The segmentation of the bronchial tree is performed using a vessel tracing algorithm based on region growing. The segmentation of the bronchial tree is a prerequisite for the determination of the lung segments. To achieve this automatically, the structure and morphology of the vessel systems have to be analysed. For this purpose the tubular structure is skeletonized. For further analysis, the skeleton is interpreted as a graph, where the vertices represent ramification points of the medical axis and the edges represent the parts of the medical axis between the ramifications. The bronchi belonging to each lung lobe and to each segment are identified automatically using graph theoretical methods. For the prediction of the lung segments based on an incomplete bronchial tree, a nearest neighbour approximation is used in order to keep the computational costs low. Using this method, a segment is approximated as the set of voxels in the interior of the lung whose distance to the specific segment subtree is smaller than their distance to all other segment subtrees.

From Selle D. et al: "Analysis of vasculature for liver surgical planning" IEEE Transactions on Medical Imaging, November 2002, IEEE, USA, vol. 21, no 11, pages 1344-1357, XP002250046 ISSN: 0278-0062 a method for segmentation of the intrahepatic vessels for a subsequent geometrical and structural analysis is known.

Hahn H. K. et al: "The skull stripping problem in MRI solved by a single 3D watershed transform" Medical Image Computing and computer assisted Intervention—MICCAI 2000. Third International Conference. Proceedings (Lecture Notes in Computer Science Vol. 1935), pages 134-143, XP002250047 2000 Berlin, Germany, Springer-Verlag, Germany ISBN: 3-540-41189-5 shows a method for brain segmentation that is based on a three dimensional watershed transformation.

From Pratikakis I. E. et al: "Low level image partitioning guided by the gradient watershed hierarchy" Signal Processing, Amsterdam, N L, vol. 75, no. 2, June 1999 (1999-06), pages 173-195, XP004164346 ISSN: 0165-1684 an imaging partitioning method based on the construction of hierarchies for a gradient watershed is known.

The present invention therefore aims to provide an improved method of lung lobe segmentation and a corresponding computer program product and computer system.

SUMMARY OF THE INVENTION

The present invention provides for a method of lung lobe segmentation which is based on structural knowledge of the lung anatomy in contrast to prior art methods which are based on morphological knowledge for extraction of lobar fissures.

In essence the present invention makes usage of the fact that the lung lobes have tubular structures which are not present in the proximity of the lobar fissures. For example the larger pulmonary blood vessels are used as such a differentiating tubular structure and/or the bronchial tubes.

In order to code the structural knowledge of the lung anatomy into the image data first a segmentation of such a tubular structure from the lung image data is performed. Next an image transformation being expressive of a degree of association between voxels, which do not belong to the segmented tubular structure and voxels, which do belong to the segmented tubular structure is performed. Hence the image data resulting from this image transformation is representative of the structural knowledge of the lung anatomy.

For example, after segmentation of such a tubular structure from the lung image data, a distance transformation is performed. For each voxel which does not belong to the tubular structure a minimal distance to the closest voxel belonging to the tubular structure is determined. This way a distance map is provided which can be visualised. By means of this transformation the rareness of larger tubes, such as larger vessels and/or bronchial tubes, in the lobar boundary areas is quantified.

Next a lobe segmentation step is performed on the basis of the distance map. For this purpose any prior art segmentation method can be used for identification of the lobes. Application of prior art segmentation methods on the distance map rather than on the original image data provides more robust results.

Alternatively a cost function is used for the image transformation. For example, a minimum cost path is searched for each voxel, which does not belong to the segmented tubular structure to one of the voxels, which does belong to the tubular structure. This cost function can also involve the density values of the original image data.

In accordance with a preferred embodiment of the invention the cost function is the sum of all density values of the original image data on a path between two voxels. Preferably the end voxel of the path, which does not belong to the tubular structure, is not included in the integration of the density values of the voxels belonging to the path. This is advantageous for increased precision of the following segmentation as voxels being located on the lobar fissures do have a slightly higher density value in comparison to their neighboring voxels. Excluding the voxel at the end point of the path therefore improves the performance of the cost function.

In accordance with a preferred embodiment of the invention thoracic image data is acquired from a suitable image modality, such as from computer tomographic images, magnetic resonance images or other three dimensional image acquisition techniques. A lung segmentation is then performed on the thoracic image data for identification of the lung image data in the three dimensional image data.

In accordance with a further preferred embodiment of the invention, the distance map is calculated by means of the Euclidean distance measure. It is important to note that various other distance measures, such as the square root of the distance or others can also be used.

In accordance with a further preferred embodiment of the invention the world coordinates of the voxels are used for calculating the distance measure. This enables to more accurately capture the structural features which are represented by the image data. For compensation of the anisotropic voxels resulting from certain image data acquisition techniques the image data is remapped to the world coordinate system prior to calculating the distance measure.

In accordance with a further preferred embodiment of the invention a weighted combination of the distance map and the original image data is performed. This has the advantage that the sharp fissure contours of the original image data are preserved in the combined image.

In accordance with a further preferred embodiment of the invention lobe segmentation is performed by means of a watershed transformation. Various watershed transformation which are as such known from the prior art can be used for this purpose:

Sijbers et al. (1997) (J. Sijbers, P. Scheunders, M. Verhoye, A. Van der Linden, D. Van Dyck, and E. Raman, "Watershed-based segmentation of 3D MR data for volume quantization", Magnetic Resonance Imaging 15(4), 1997), U.S. Pat. No. 5,463,698 shows a fast implementation of the watershed transformation (WT) with markers based on hierarchically organized queues, Hahn et al (H. K. Hahn and H.-O. Peitgen, "The Skull Stripping Problem In MRI Solved By A Single 3D Watershed Transformation", Medical Image Computing and Computer-Assisted Intervention (MICCAI 2000), Pittsburgh, Springer LNCS: 134-143, 2000), the disclosure of which being expressly incorporated herein by reference, have been the first to describe the direct application of the WT to a three-dimensional medical imaging problem.

In accordance with a further preferred embodiment of the invention, the voxels belonging to the tubular structure are inverted in the distance map or the combined image. This is particularly advantageous for marker-based watershed transformations as the effect of the inversion is that, due to the nature of the 3D watershed algorithim, the type of the marker placed on the large vessel or bronchial tube close to the hilus will be spread along with the 'rising water' through the lobar tubular subsystem.

Further the present invention provides for a corresponding computer program product and computer system for performing the method of the invention.

BRIEF DESCRIPTION OF THE DRAWINGS

In the following preferred embodiments of the invention will be described in greater detail by making reference to the drawings in which.

DETAILED DESCRIPTION OF PREFERRED EMBODIMENTS OF THE INVENTION

Figure 1:
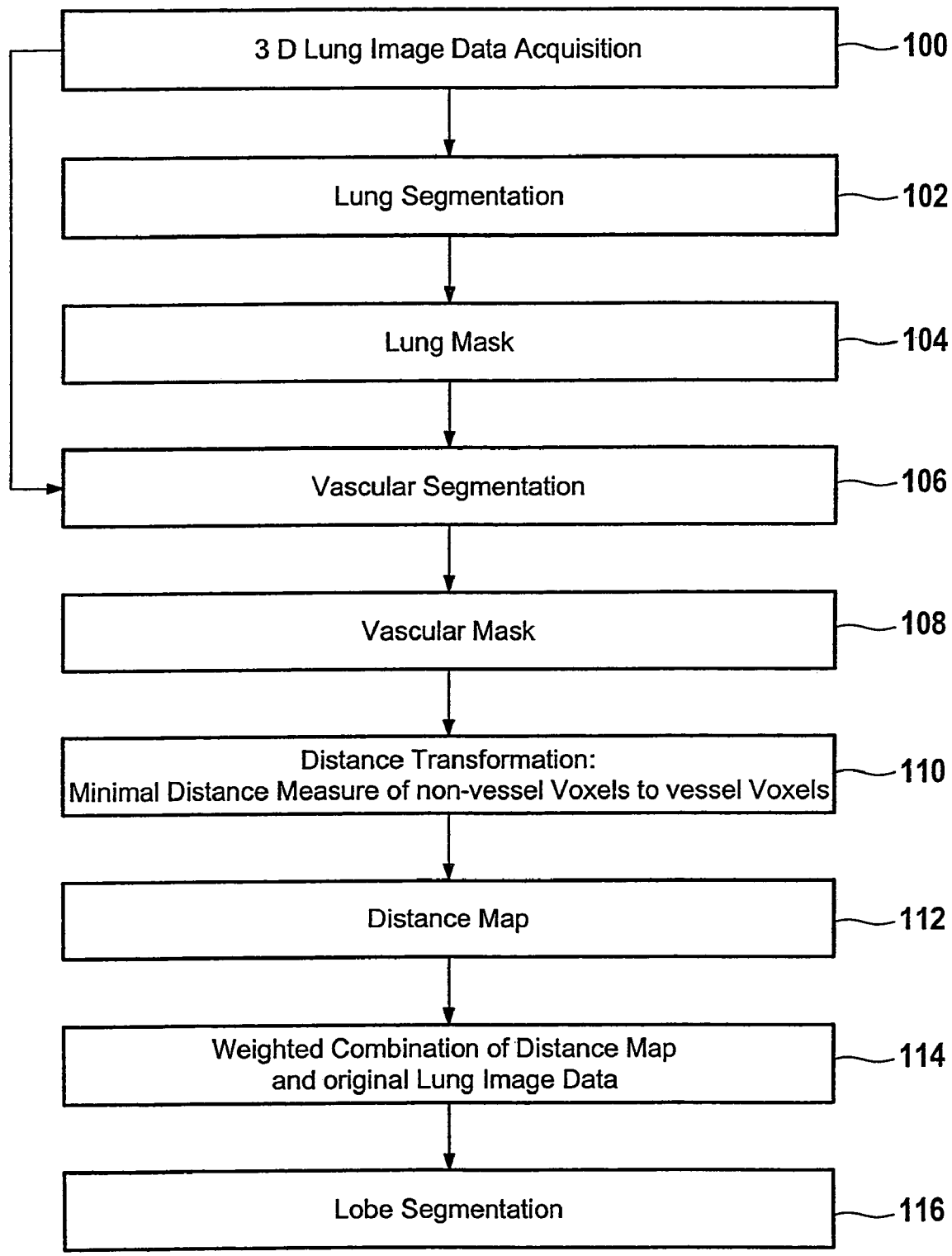
FIG. 1 is illustrative of a flow chart of an embodiment of the present invention.

FIG. 1 shows a flow chart for lung lobe segmentation. In step 100 three dimensional lung image data is acquired by computer tomography, nuclear magnetic resonance tomography or by means of another image modality. For example thoracic image data is acquired from chest computer tomography data.

Without restriction of generality it is assumed that the image data covers an input volume V of dimensions X×Y×Z. The set of all voxel positions within the input volume is defined as V:={0, ..., X−1}×{0, ..., Y−1}×{0, ..., Z−1} whilst I:=$(i_v)_{v \in V}$ refers to the 3D input matrix. An entry $i_v$ denotes the integer density value of the voxel v within the input volume. For example, values range from 0 to 4095 corresponding to Hounsfield Units (HU) between −1024 HU and 3071 HU. In case the world coordinates of voxel v are used this in indicated by world (v).

In step 102 a lung segmentation procedure is performed on the image data I, if necessary. Performing such a lung segmentation method in step 102 is particularly beneficial if the image data I covers additional body regions other than the lungs. Further, lung segmentation is useful for separation of the lungs. For fully automatic lung segmentation the method of S Hu, E A Hoffman, and J M Reinhardt, "Automatic lung segmentation for accurate quantitation of volumetric x-ray ct images," IEEE Transaction on medical imaging 20, pp. 490-498, June 2001 can be utilised.

As a result of the lung segmentation performed in step 102 a lung mask is provided in step 104 for each of the lungs. The lung mask covers the volume V and indicates for each voxel within the volume V whether the voxel belongs to the lung or not.

In step 106 a segmentation of a tubular structure of a lung is performed. In the example considered here the blood vessels are segmented in the area defined by the lung mask. Alternatively or in addition another tubular structure such as the bronchial tubes can be segmented. The segmentation in step 106 is carried out on the original image I but taking into account only the voxels which are identified by the lung mask as lung-voxels. In other words the segmentation of step 106 is restricted to the area defined by the lung mask.

In step 108 a mask is provided which identifies the voxels belonging to the tubular structure. In the case of a vascular segmentation the mask provided in step 108 is a vascular mask. Similar to the lung mask the vascular mask also covers the volume V and contains an indication for each voxel within the volume V, whether the voxels belong to the tubular structure or not. For example the vascular mask provided in step 108 can be provided by a function tub: V {0, 1} that maps each voxel v in V:

tub (v):=1, if v was identified as a vessel voxel, 0, otherwise.

In the case of vascular segmentation only larger vessels are taken into account. This is because it has been observed that larger vessels are absent in the areas of the fissures. By segmentation of the vasculature this observation is quantified for computational use.

Because of the high contrast between the blood vessels and the parenchyma, a conventional 3D region growing algorithm is sufficient to obtain at least a super set of all larger pulmonary blood vessels. As an alternative to region growing techniques other image segmentation methods can be used (cf. "Handbook of medical imaging, processing and analysis", Isaac N. Bankman, Academic Press 2000, chapter 12, sub chapter 3). When 3D region growing is used the image data is searched for a bright area in the image region where the hilus is expected such that a suitable seed point is automatically detected. A fixed-neighbourhood relation is used in combination with a fixed threshold to distinguish the vessels roughly from the parenchyma.

To quantify the rareness of larger tubular structures, in particular larger vessels or bronchial tubes, in the lobar boundary areas, a distance transformation is performed in step 110. In the example considered here the Euclidean distance is used as a distance measure.

In other words, to compute the distance map D:=$(d_v)_{v \in V}$, the Euclidean distance $d_v$ of each voxel v in V to the closest vessel voxel is calculated. It is preferred that each voxel's world coordinates are used in order to account for voxel anisotropy.

$$d_v := \min\{\|\text{world}(v) - \text{world}(v')\|_2 : v' \in V \wedge \text{tub}(v') = 1\} \quad (1)$$

For computation of the distances, the multi-dimensional distance transform algorithm for digitised image which is such known from T Saito and J.-I Toriwaki, "New algorithms for Euclidean distance transformation of an n-dimensional digitised picture with applications," Pattern Recognition 27, pp. 1551-1565, 1994 can be utilised.

The resulting distance map D covers the volume V and contains a minimal distance measure $d_v$ for each lung voxel which does not belong to the tubular structure to a neighbouring tubular voxel belonging to the segmented tubular structure. All other coordinates within the distance map can be set to zero. The distance map is outputted in step 112.

Due to the distance transformation the distance map integrates structural knowledge about the lung lobes. This is why the distance map can be used for improved lobe segmentation. For this purpose any prior art image segmentation method can be applied on the distance map for improved lobe segmentation. However, when high resolution images are available, it is preferred to refine the distance map prior to performing the lobe segmentation.

Although there are still plenty of older CT scanners in clinical use producing low resolution data, where the lobar fissures are not or barely visible, an increased number of radiological facilities is equipped with multi-slice CT scanners yielding high resolution images. In these scans, the fissures show at least partially a noticeably higher density than the surrounding parenchyma. Thus it is preferred to refine the blurred structures visible in the distance image. This can be achieved by performing a linear combination of D with the original I to a third volume.

$$C := \alpha * I + \beta * D (\alpha > 0, \beta > 0) \quad (2)$$

For example α=1 is a good choice of α.

The preferred choice of beta is between 1 and 100, preferably between β=3 and β=30. The parameters α and β can be chosen depending on the image acquisition parameters.

For example, the parameter α=1; the parameter β is selected depending on slice thickness. When the slice thickness is below a predefined threshold value of for example 1.5 mm then a small value for β is chosen, for example $\beta=3$. When the slice thickness is above 1.5 mm a good choice for β is $\beta=30$.

By means of this linear combination the sharp fissure contours are preserved in the distance image C, which is based on the distance map D.

In step 116 the lobe segmentation is performed on the combined image C. For this purpose any prior art image prior art image segmentation method can be utilised.

However it is preferred to use a watershed transformation for the lobe segmentation, preferably an interactive marker-based watershed transformation. Such a watershed transformation is as such known from Hahn et al. In essence the multi-dimensional interactive watershed transformation proposed by Hahn consists of two steps:

First, all image elements are sorted according to their image intensity using a Bucket Sort algorithm. Second, each element is processed exactly once in the specified order with respect to its 6-neighbourhood. The detected basins are hierarchically organised in a tree allowing efficient partitioning. Sorting, watershed transform, and tree generation are linear in time. After the watershed transform, an arbitrary number of markers is evaluated in real-time to control tree partitioning and basin merging.

To keep the interaction as small as possible, the information provided by those markers is transported throughout the complete sub-tree belonging to the selected vessel. This is why it is advantageous not to use the image C directly as input for the IWT, but the image C' in which the vessels are inverted.

$C':=(c'_v)_{v \in V}$ is formally defined by $$c'_v := M+c_v, \text{ tub}(v)=0$$

$$M-i_v, \text{ otherwise.} \quad (3)$$

Where the value M denotes the absolute maximum density value of any segmented tubular voxel. The effect of the inversion of the vasculature is that, due to the nature of the 3D watershed algorithm, the type of a marker placed on a large vessel close to the hilus will be spread along with the "rising water" through the lobar vessel subsystem. Thus, it gets distributed in all parts of the lobe before reaching the level M and successively flooding the parenchyma, eventually building the watersheds.

Again this works equally well for vascular segmentation and for bronchial segmentation. In either case the value M is determined by searching the segmented tubular voxels belonging to the segmented tubular structure for the voxel having the highest density value. The value of M is then set to this maximum density value. For a tubular voxel the resulting transformed value $c'_v$ is obtained by adding the combined value $c_v$ to M; for non-tubular voxels the original density value $i_v$ is subtracted from M. In the case of bronchial segmentation it is preferred to use $$c'_v := M+c_v, \text{ tub}(v)=0$$

$$i_v, \text{ otherwise.} \quad (4)$$

instead of (3).

For example steps 106 to 116 are performed for the left lung and subsequently for the right lung or visa versa. Alternatively the processing for the left and right lungs can also be performed in parallel.

Based on the lobe segmentation provided in step 116 further data processing can be performed for quantitative lobar analysis such as determination of lobar volumes.

This robust and reproducible lobe segmentation provides boundaries for further segmentation steps and yields landmarks for registration procedures. It also enables a lobe-based CT parameter extraction and therefore enables a more accurate prediction of post-operative lung function in case of a lobar resection, which is the standard treatment for early stage lung cancer.

It is a further advantage that the method of FIG. 1 successfully deals with fissures' low contrast and variable appearance, which, in some case, makes it impossible to determine their exact location by visual inspection even for experts.

Measuring about one millimetre in thickness, the lobar fissures only show up as thin bright lines on high resolution CT images. For lower resolution scans which are still widely used due to old scanning devices or for dose reduction, the fissure density averages with the surrounding parenchyma and the fissures merely appear as diffuse clouds of slightly higher density in an area with little or no vasculature. Furthermore, various pulmonary diseases can affect their imaging appearance. Nearby tumours, atelectasis, or emphysematous changes can present additional problems for fissure segmentation algorithms.

The method of FIG. 1 enables to deal with all these problems due to the distance transformation which is based on tubular segmentation and provides a process which works robustly under clinical conditions.

Figure 2:
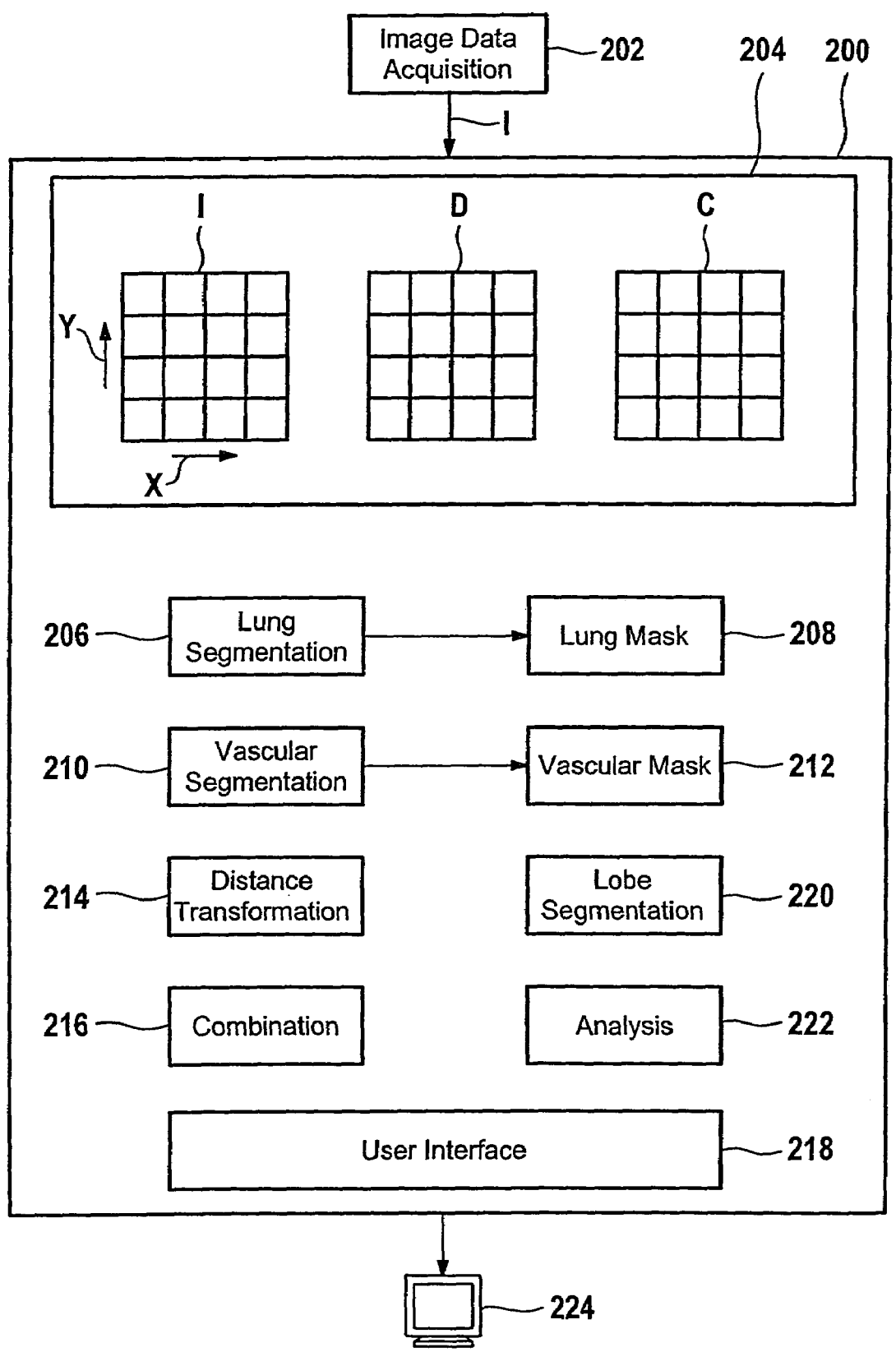
FIG. 2 is a block diagram of an embodiment of a computer system of the invention.

FIG. 2 shows a block diagram of a computer system 200 which can be used for performing the method of FIG. 1. Computer system 200 is coupled to medical image data acquisition system 202 which provides three dimensional image data I to computer 200. The three dimensional image data I is stored in storage 204 of computer system 200.

Further computer system 200 has a computer program 206 for performing a lung segmentation on the basis of the image data I stored in storage 204. Program 206 provides lung mask 208 which identifies those voxels of image I which belong to the left and/or right lung.

Program 210 of computer system 200 serves for segmentation of a tubular structure from the identified lung voxels. In the example considered here vascular segmentation is performed which provides a vascular mask 212. Vascular mask 212 identifies those lung voxels which belong to a lung vessel.

Program 214 serves to perform a distance transformation to provide the distance map D. Distance map D is also stored in storage 204. Program 216 serves to combine the image data of the image I and the data of the distance map D in accordance with above equation (2). The values for the parameters alpha and beta can be selected by a user through user interface 218. The resulting combined image C is stored in storage 204.

Program 220 implements an image segmentation method for lobe segmentation. Program 220 is performed either on the distance map D or on the combined image data C which are stored in storage 204. The result of the lobe segmentation provided by program 220 can be inputted into program 222 for further analysis. In particular the lobe volumes can be calculated on the basis of the lobe segmentation provided by program 220. The results can be displayed on display unit 224 which is coupled to computer system 200.

Figure 3:
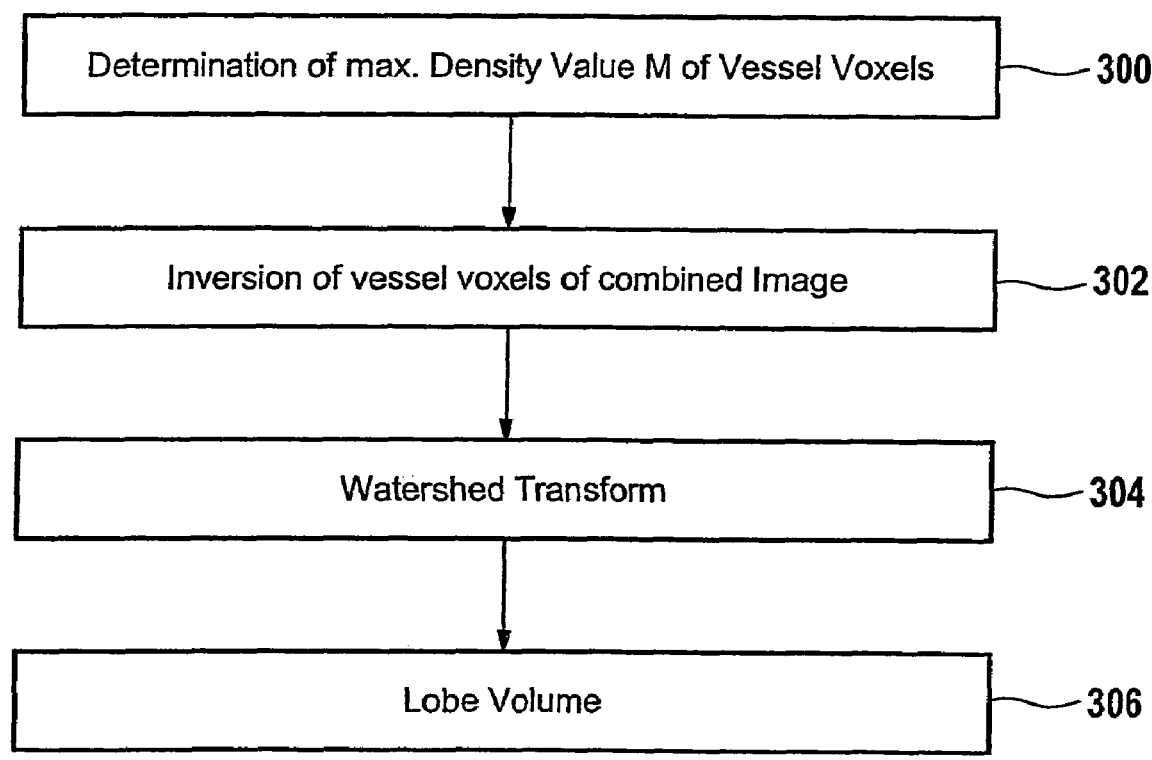
FIG. 3 is illustrative of an application for determination of a lobe volume.

FIG. 3 is illustrative of a flow chart of an embodiment of the method of FIG. 1 using a watershed transform method for the lobe segmentation. In step 300 the maximum density value M of the tubular voxels, such as the vessel or bronchial voxels, is determined. (cf. above equation (3)) Next, in step 304 a watershed transformation is performed on the inverted image C'. This way the lung lobes are segmented. On this basis the lobe volumes are calculated in step 306.

Figure 4:
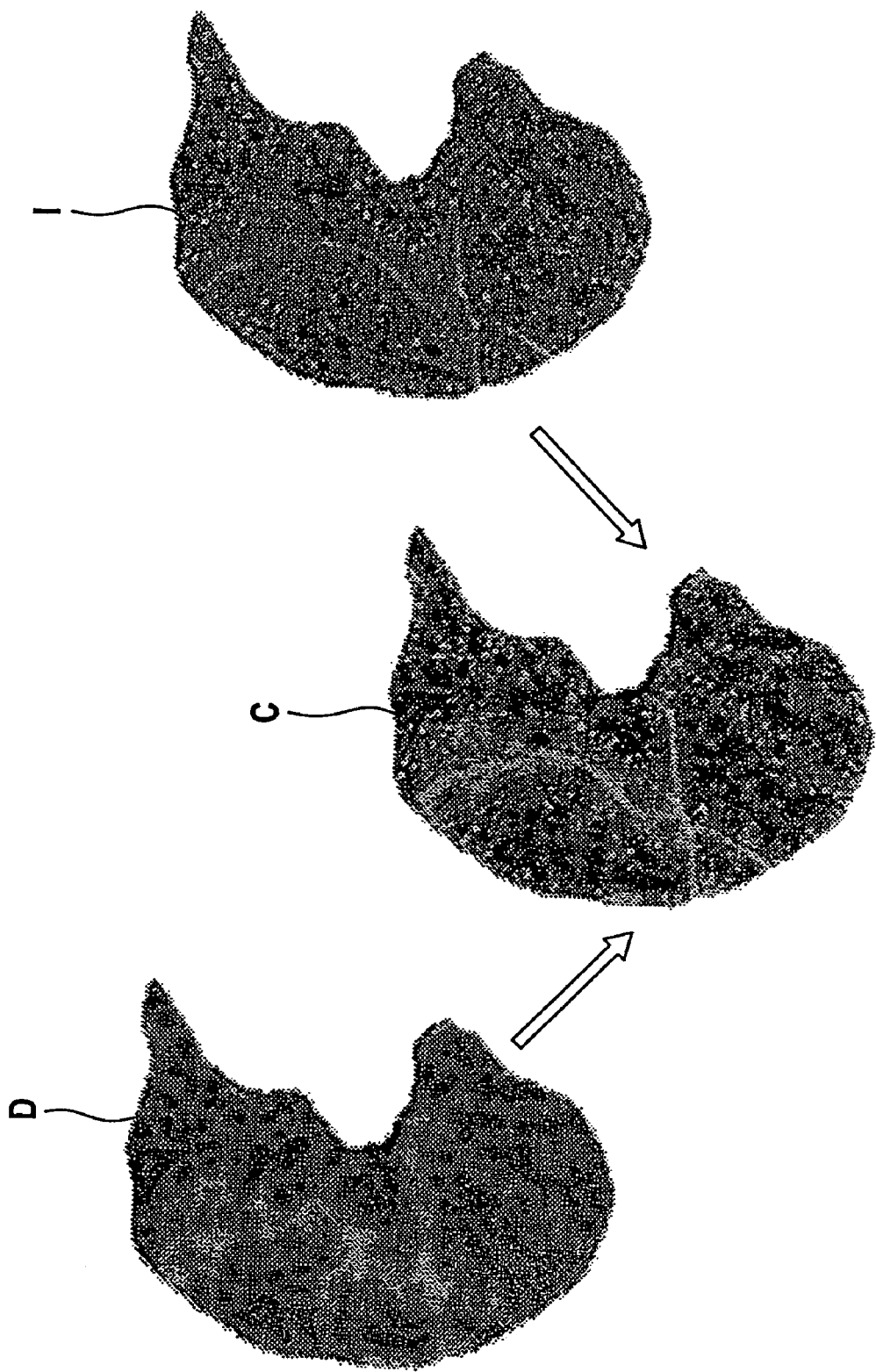
FIG. 4 shows the result of a combination of a distance image and original image data.

FIG. 4 is illustrative of the beneficial effect of the combination of the images in accordance with above equation (2). For the combination of the distance image D and the original image I $\alpha=1$ and $\beta=30$ have been used. In the distance image D to the left in FIG. 4, the fissure locations can be visually estimated but appear blurred, whereas in the original image I to the right the fissures can be traced in more detail but partially show little or no contrast. In the combined image C however, the thin fissure lines are broadened and, where not visible, roughly continued by the influence of the distance image D. This results in a more robust lobar separation in the following lobe segmentation step, such as by watershed transformation.

LIST OF REFERENCE NUMERALS

200 Computer system
202 image data acquisition system
204 storage
206 program
208 lung mask
210 program
212 vascular mask
214 program
216 program
218 user interface
220 program
222 program
224 display unit

What is claimed is:

1. A method of lung lobe segmentation comprising the steps of:
   providing of three dimensional first image data of a lung,
   performing segmentation of the first image data with respect to a tubular structure located within the lung to identify first voxels of the first image data belonging to the tubular structure and to identify second voxels of the first image data which do not belong to the tubular structure,
   performing an image transformation on the first image data being expressive of a degree of association between the identified first and the second voxels to provide second image data,
   performing a weighted combination of the first image data and the second image data to provide third image data,
   performing a lobe segmentation based on the third image data, and
   obtaining an output of the lobe segmentation indicative of the lobes of the lung.

2. The method of claim 1, the image transformation comprising determining a distance measure for each one of the second voxels to one of the first voxels.

3. The method of claim 2, the distance measure being determined by determining a minimum distance between each one of the second voxels to one of the first voxels to provide the second image data.

4. The method of claim 2, whereby the world coordinates of the first and second voxels are used for determining the distance.

5. The method of claim 1, the image transformation being performed by means of a cost function between the first and second voxels.

6. The method of claim 5, the cost function being the sum of all density values of the voxels on a path between a pair of first and second voxels and further comprising determining a minimum cost path for each one of the second voxels to one of the first voxels to provide the second image data.

7. The method of claim 1, the step of providing first image data comprising acquisition of thoracic image data and lung segmentation of the thoracic image data to provide the first image data.

8. The method of claim 1, whereby the tubular structure is a vascular structure or a bronchial structure.

9. The method of claim 1, whereby the first and the second voxels are identified by means of a first segmentation mask.

10. The method of claim 1, whereby the output is displayed, printed or stored.

11. The method of claim 1, whereby the lobe segmentation is performed by means of a watershed transformation.

12. The method of claim 11, whereby the first voxels are inverted prior to the watershed transformation.

13. A computer readable medium containing program instructions for performing lung lobe segmentation; performing segmentation of a three dimensional first image data of a lung with respect to a tubular structure located within the lung to identify first voxels of the first image data belonging to the tubular structure and to identify second voxels of the first image data which do not belong to the tubular structure; performing an image transformation on the first image data being expressive of a degree of association between the identified first and the second voxels to provide second image data; performing a weighted combination of the first image data and the second image data to provide third image data, performing a lobe segmentation based on the third image data, and obtaining an output of the lobe segmentation indicative of the lobes of the lung.

14. A computer system comprising:
   a memory component for storing of three dimensional first image data of a lung,
   a first program component for performing segmentation of the first image data with respect to a tubular structure located within the lung to identify first voxels of the first image data belonging to the tubular structure and to identify second voxels of the first image data which do not belong to the tubular structure,
   a second program component for determining a distance measure for each one of the second voxels, by determining a minimum distance between each one of the second voxels to one of the first voxels to provide second image data
   a third program component for performing a weighted combination of the second image data and the first image data to provide third image data,
   a fourth program component for performing a lobe segmentation based on the third image data, and
   a fifth program component for obtaining an output of the lobe segmentation indicative of the lobes of the lung.

15. The computer system of claim 14 further comprising means for acquisition of thoracic image data and a sixth program component for lung segmentation of the thoracic image data to provide the first image data.

16. The computer system of claim 14, the first program component being adapted to provide a first segmentation mask for identification of the first and second voxels.

17. The computer system of claim 14, whereby the second program component is adapted to calculate an Euclidean distance between a pair of first and second voxels.

18. The computer system of claim 14, further comprising seventh program means for providing world coordinates of the first and second voxels for determination of the distance.

19. The computer system of claim 14, the fourth program component being adapted to perform a watershed transformation.

20. The computer system of claim 19, further comprising an eighth program component for inversion of the first voxels prior to the watershed transformation.

* * * * *